(12) United States Patent
Chen et al.

(10) Patent No.: US 12,044,938 B2
(45) Date of Patent: Jul. 23, 2024

(54) PIXEL STRUCTURE, DISPLAY PANEL AND DISPLAY DEVICE

(71) Applicant: HKC CORPORATION LIMITED, Shenzhen (CN)

(72) Inventors: Min Chen, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/145,342

(22) Filed: Dec. 22, 2022

(65) Prior Publication Data

US 2024/0045283 A1 Feb. 8, 2024

(30) Foreign Application Priority Data

Aug. 5, 2022 (CN) .......................... 202210937213.1

(51) Int. Cl.
*G02F 1/1343* (2006.01)
*G02F 1/1339* (2006.01)

(52) U.S. Cl.
CPC ...... *G02F 1/13439* (2013.01); *G02F 1/13394* (2013.01); *G02F 1/13396* (2021.01); *G02F 1/134309* (2013.01); *G02F 2201/121* (2013.01); *G02F 2201/123* (2013.01)

(58) Field of Classification Search
CPC ......... G02F 2201/123; G02F 2201/121; G02F 1/134309; G02F 1/13396; G02F 1/13394; G02F 1/13439

See application file for complete search history.

(56) References Cited

U.S. PATENT DOCUMENTS

| | | | |
|---|---|---|---|
| 2012/0307172 A1 | 12/2012 | Yoshida | |
| 2020/0355956 A1 | 11/2020 | Chang et al. | |
| 2021/0033915 A1 | 2/2021 | Huang et al. | |
| 2021/0157190 A1* | 5/2021 | Ito | G02F 1/133345 |
| 2021/0286210 A1* | 9/2021 | Wakayama | G06F 3/047 |

FOREIGN PATENT DOCUMENTS

| | | |
|---|---|---|
| CN | 101086592 A | 12/2007 |
| CN | 102890368 A | 1/2013 |
| CN | 103487972 A | 1/2014 |
| CN | 103715229 A | 4/2014 |
| CN | 107703683 A | 2/2018 |
| JP | 2004302298 A | 10/2004 |

* cited by examiner

*Primary Examiner* — Mariam Qureshi
(74) *Attorney, Agent, or Firm* — Maier & Maier, PLLC (57) ABSTRACT

A pixel structure, a display panel and a display device. The pixel structure includes a pixel electrode and a common electrode. The pixel electrode and the common electrode each is one of a pixel electrode and a common electrode. The common electrode includes a plurality of first branch portions. The pixel electrode includes second branch portions and a plurality of trunk portions. The second branch portions and the first branch portions are alternately arranged at intervals. In the present application, portions of the pixel electrode within an orthographic projection range of an offset of a spacer are extended to form a plane by configuring a height of each first trunk portion to be higher than a height of each second trunk portion along a linear direction in which the second branch portions are located, thereby increasing the pressure-bearing capacity of the pixel electrode.

13 Claims, 7 Drawing Sheets

PIXEL STRUCTURE, DISPLAY PANEL AND DISPLAY DEVICE

CROSS-REFERENCE TO RELATED APPLICATION

Pursuant to 35 U.S.C. § 119 and the Paris Convention, this application claims the benefit of Chinese Patent Application No. 202210937213.1 filed on Aug. 5, 2022, the content of which is incorporated herein by reference.

FIELD

The present application relates to the field of display technology, and in particular, to a pixel structure, a display panel and a display device.

BACKGROUND

The statements provided herein are merely background information related to the present application, and do not necessarily constitute any prior arts. In the existing in-plane switching (IPS) display technology, the common electrode and pixel electrode can be formed by tin-doped indium oxide (ITO), and a spacer support is required by the display panel after the cell process. The relative displacement of the spacer during a support process forms an offset range, which will cause the pixel electrode to be squeezed and thereby causing the pixel electrode cracked or fractured. In a display of pixels, the liquid crystal in the vertical direction of the fracture cannot be deflected due to the existence of cracks and fractures in the pixel electrode, so the undesirable phenomenon of dark lines is appeared in the pixel display, which directly affects the quality of the panel and customer experience, and thus there are many shortcomings in the existing IPS display technology.

SUMMARY

The present application provides a pixel structure, a display panel and a display device, aiming at solving the problem that the relative displacement of the spacer during a support process forms an offset range, which will cause the pixel electrode to be squeezed and thereby causing the pixel electrode cracked or fractured.

In accordance with a first aspect of embodiments of the present application, a pixel structure is provided, which includes a pixel electrode and a common electrode. The pixel electrode and the common electrode each is one of a pixel electrode and a common electrode. The common electrode includes a plurality of first branch portions. The pixel electrode includes second branch portions and trunk portions, the first branch portions and the second branch portions are alternately arranged at intervals. The trunk portions include first trunk portions and second trunk portions, the first trunk portions are located within an orthographic projection range of an offset of a spacer of the pixel structure, and the second trunk portions are located outside the orthographic projection range, each trunk portion is connected with one end of each of two adjacent second branch portions. A height of each first trunk portion is higher than a height of each second trunk portion along a linear direction in which the second branch portions are located.

In an optional embodiment, along a direction towards the second trunk portions, the first trunk portions include at least one first trunk sub-portion close to the second trunk portions and second trunk sub-portions away from the second trunk portions. Each second trunk sub-portion has a height higher than that of the at least one first trunk sub-portion along the linear direction in which the second branch portions are located.

In an optional embodiment, edges of the first trunk portion away from the second branch portions are contracted inwardly to a setting height, respectively, along the linear direction in which the second branch portions are located.

In an optional embodiment, the common electrode also includes a limit portion being within the orthographic projection range, and an orthographic projection of the spacer and an orthographic projection of the limit portion are overlapped. An edge of the limit portion near the trunk portions is extended towards the trunk portions for a setting length to increase an overlap area between the orthographic projection of the limit portion and the orthographic projection of the spacer.

In an optional embodiment, the pixel structure also includes a metal layer, the metal layer has an orthographic projection covering the trunk portion. The metal layer includes a first metal body located within the orthographic projection range and a second metal body located outside the orthographic projection range. The first metal body has a height being higher than that of the second metal body along the linear direction in which the second branch portions are located, and edges of the first metal body and the second metal body near the first branch portions are in a gap formed between the first branch portions and the trunk portions.

In an optional embodiment, edges of the first metal body along the linear direction in which the second branch portions are located, are arranged in parallel to the second branch portions.

In an optional embodiment, at least overlap points are existed between edges of the first trunk portions near the first branch portions and an edge of the orthographic projection range.

In an optional embodiment, the spacer is a main photo spacer and a difference between a radius of the orthographic projection range and a radius of the main photo spacer is in a range of 25-45 um, or alternatively, the spacer is a sub photo spacer and a difference between the radius of the orthographic projection range and a radius of the sub photo spacer is in a range of 0-25 um.

In accordance with a second aspect of the embodiments of the present application, a display panel is provided, which includes the pixel structure as described above.

In accordance with a third aspect of the embodiments of the present application, a display device is provided, which includes the display panel as described above.

It would be clear from the above solutions that the pixel structure, the display panel and the display device provided by the present application can effectively prevent the phenomenon of cracks or fractures due to pressure-bearing and improve the problem of undesirable dark lines appearing in the pixel display by extending portions of the pixel electrode within the orthographic projection range of the offset of the spacer to form a plane which thereby increases the pressure-bearing capacity of the pixel electrode.

BRIEF DESCRIPTION OF DRAWINGS

In order to illustrate the solutions in the embodiments of the present application more clearly, the following will briefly introduce the drawings that need to be used in the description of embodiments or existing technologies. It will be apparent that the drawings described in here are only some embodiments of the present application, and for those

DETAILED DESCRIPTION

In order to make the objectives, solutions and beneficial effects of the present application more comprehensible, the present application will be further described in detail below with reference to the drawings and embodiments. It should be understood that specific embodiments described herein are only used to explain the present application, but not to limit the present application.

In addition, the terms "first" and "second" are used for descriptive purposes only and should not be understood as indicating or implying relative importance or as implicitly indicating the number of features indicated. Thus, a feature defined with "first" and "second" may explicitly or implicitly include one or more such features. In the description of the present application, the phrase "a/the plurality of" means two or more, unless otherwise expressly and specifically limited. It should be noted that the pixel structure, display panel and display device disclosed in this application may be applied in the field of display technology, and may also be applied to any other fields in addition to the field of display technology. The application fields of the pixel structure, display panel and display device disclosed in the present application are not limited.

In the liquid crystal display panel, spacers are required for supporting, and a relative displacement of the spacer during a support process forms an offset range, the offset range will cause the pixel electrodes to be squeezed and thereby causing the pixel electrodes to be cracked or fractured. In a display of pixels, the liquid crystal in the vertical direction of the fractures cannot be deflected due to the existence of cracks and fractures in the pixel electrode. In view of this, the present application increases the pressure-bearing capacity of the pixel electrode by configuring the height of each first trunk portion to be higher than the height of each second trunk portion along a linear direction in which the second branch portions are located, thus portions of the pixel electrode within the orthographic projection range of the offset of the spacer are extended to form a plane, whereby the phenomenon of cracks or fractures due to pressure-bearing can be effectively prevented and the problem of undesirable dark lines appearing in the pixel display can be improved. The present application will be illustrated in detail below with reference to specific embodiments.

Figure 1A:
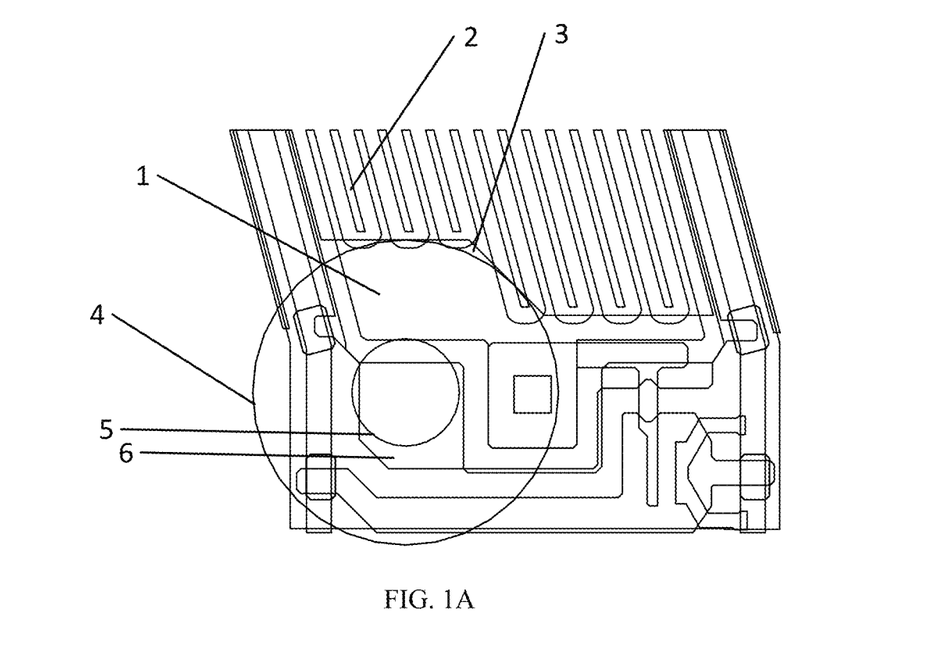
FIG. 1A is a first schematic diagram of a pixel structure in accordance with an embodiment of the present application.
Figure 1B:
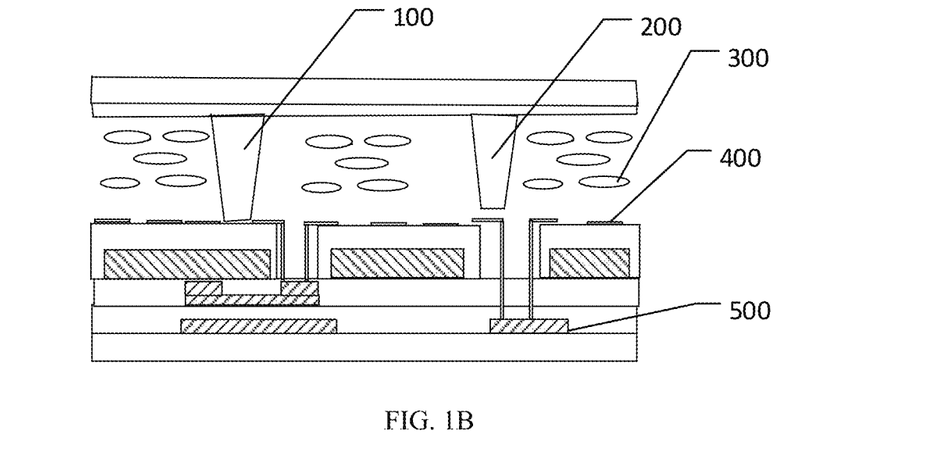
FIG. 1B is a cross-sectional schematic view of the pixel structure in accordance with an embodiment of the present application.
Figure 2:
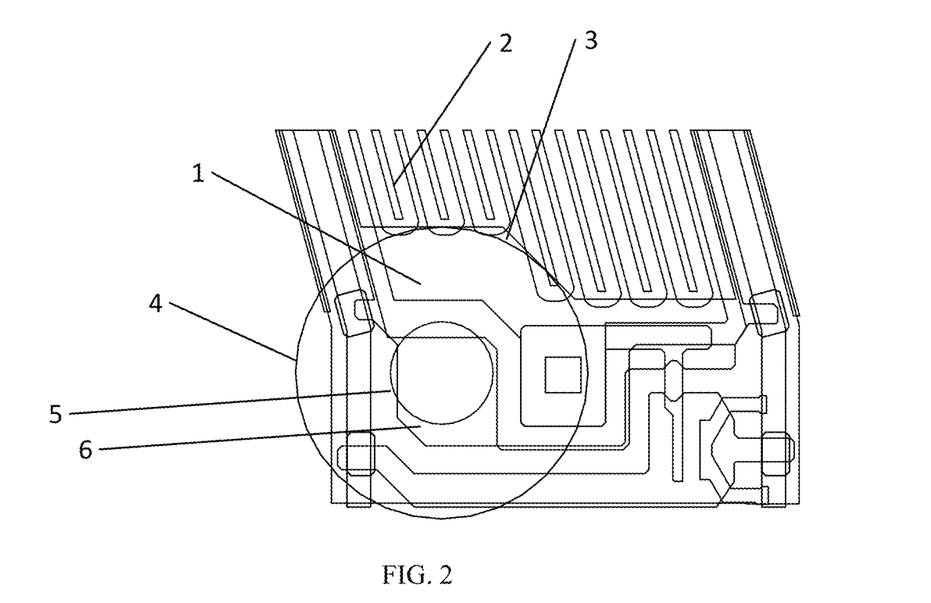
FIG. 2 is a second schematic diagram of the pixel structure in accordance with an embodiment of the present application.
Figure 3:
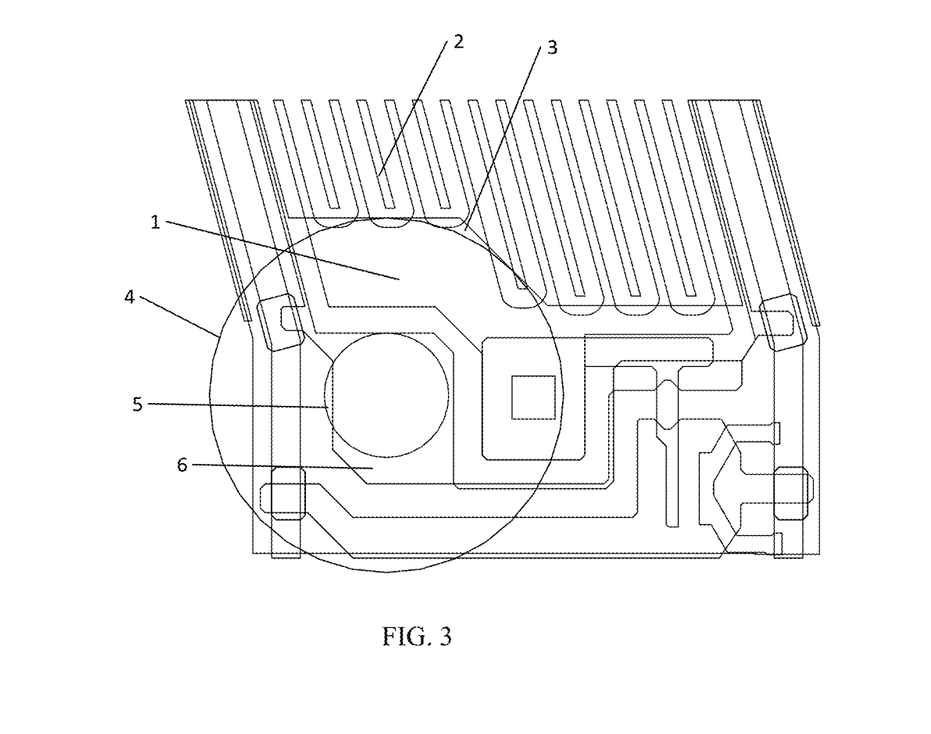
FIG. 3 is a third schematic diagram of the pixel structure in accordance with an embodiment of the present application.
Figure 4:
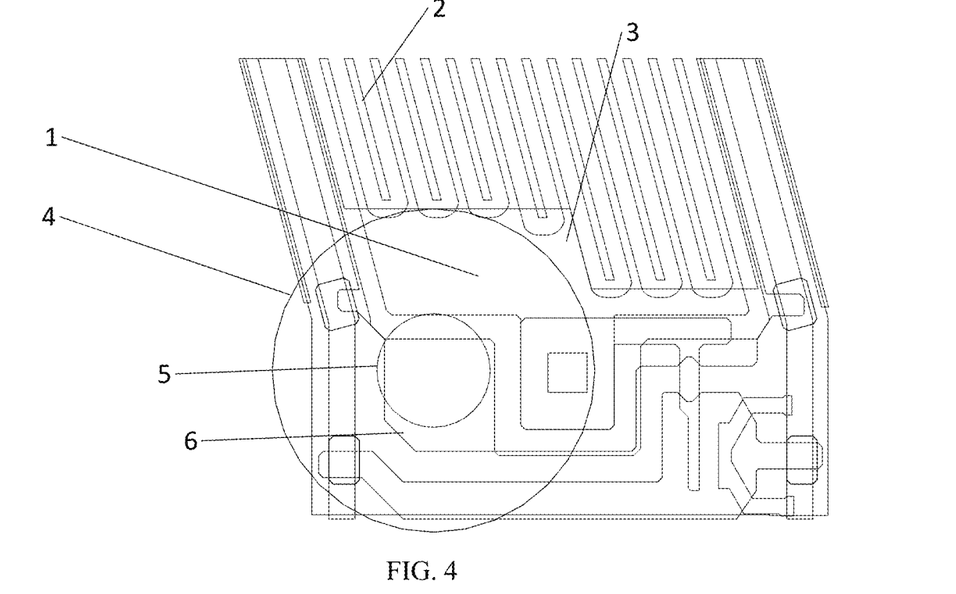
FIG. 4 is a fourth schematic diagram of the pixel structure in accordance with an embodiment of the present application.
Figure 5:
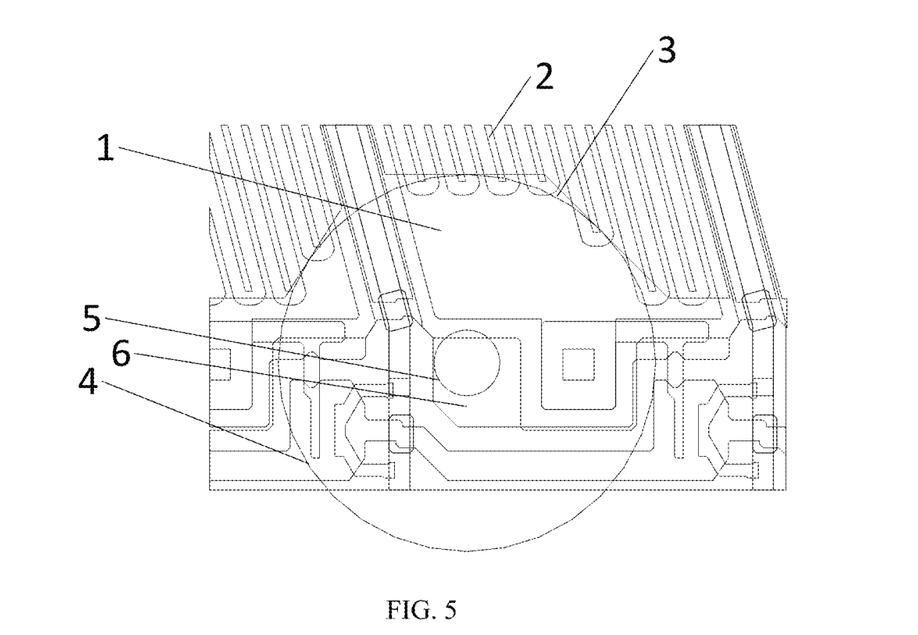
FIG. 5 is a fifth schematic diagram of the pixel structure in accordance with an embodiment of the present application.
Figure 6:
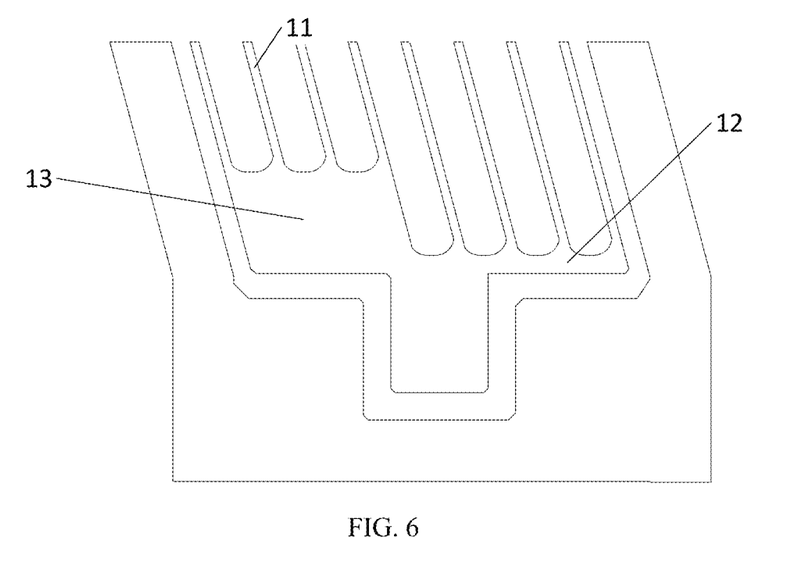
FIG. 6 is a first schematic diagram of a distribution of a pixel electrode in accordance with an embodiment of the present application.
Figure 7:
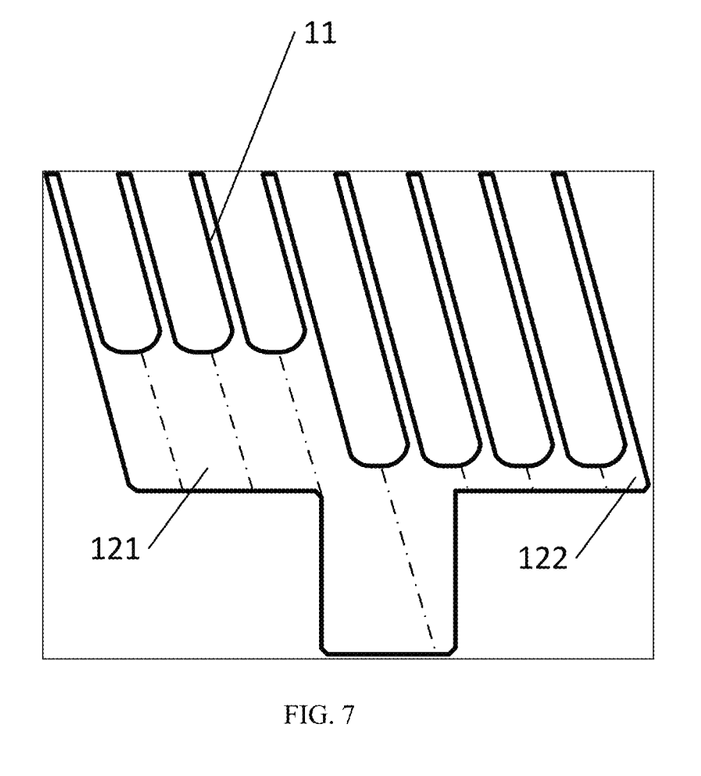
FIG. 7 is a second schematic diagram of the distribution of the pixel electrode in accordance with an embodiment of the present application.
Figure 8:
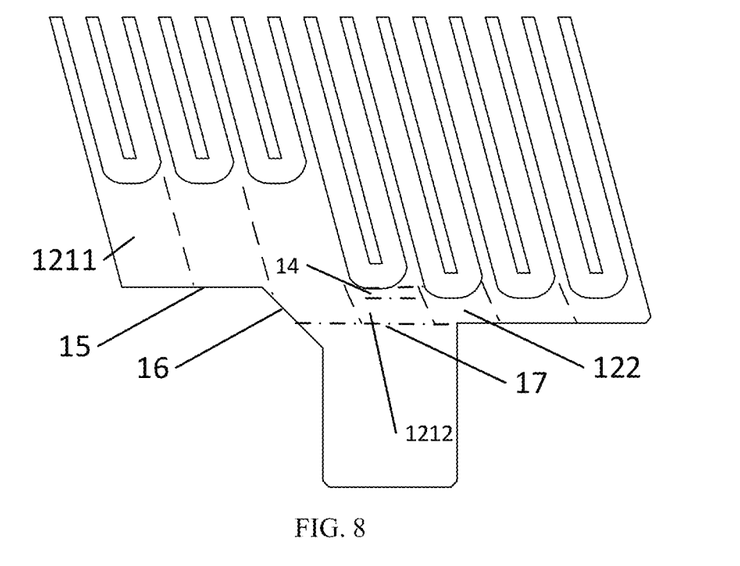
FIG. 8 is a third schematic diagram of the distribution of the pixel electrode in accordance with an embodiment of the present application.
Figure 9:
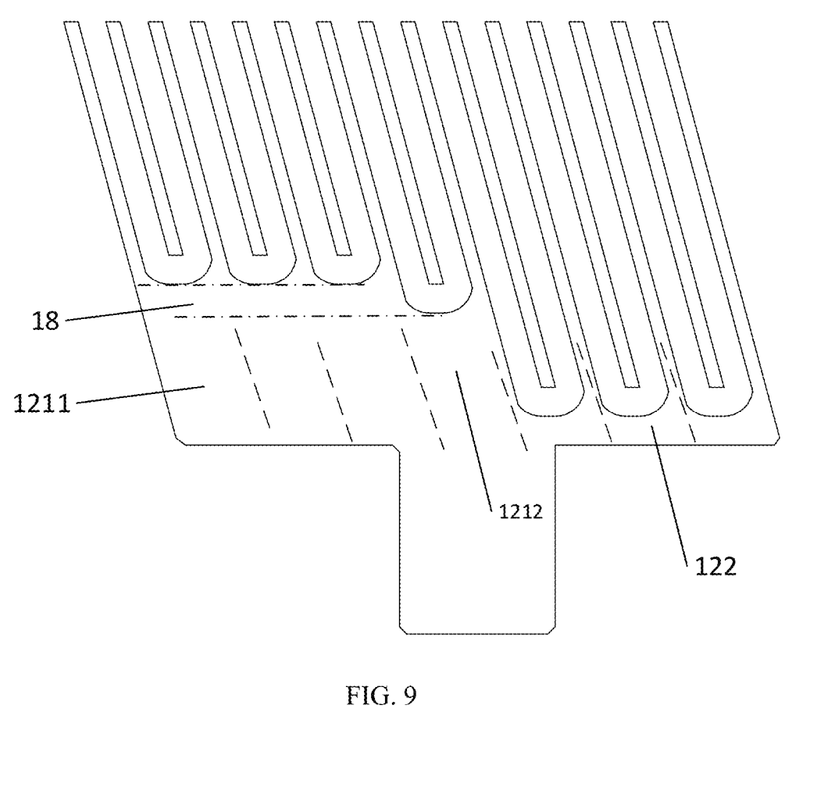
FIG. 9 is a fourth schematic diagram of the distribution of the pixel electrode in accordance with an embodiment of the present application.

FIG. 1A illustrates a first pixel structure in accordance with an embodiment of the present application. FIG. 1B illustrates a schematic cross-sectional view of the pixel structure. FIG. 2 is a second schematic diagram of the pixel structure in accordance with an embodiment of the present application. FIG. 3 is a third schematic diagram of the pixel structure in accordance with an embodiment of the present application, FIG. 4 is a fourth schematic diagram of the pixel structure in accordance with an embodiment of the present application. FIG. 5 is a fifth schematic diagram of the pixel structure in an embodiment of the present application. FIG. 6 is a first schematic diagram of a distribution of a pixel electrode in accordance with an embodiment of the present application. FIG. 7 is a second schematic diagram of the distribution of the pixel electrode in accordance with an embodiment of the present application. FIG. 8 is a third schematic diagram of the distribution of the pixel electrode in accordance with an embodiment of the present application. FIG. 9 is a fourth schematic diagram of the distribution of the pixel electrode in accordance with an embodiment of the present application.

The pixel structure of the present application is described in detail below with reference to FIG. 1A to FIG. 9. As shown in FIGS. 1A to 9, the pixel structure of the present application includes: a pixel electrode 1 and a common electrode. The common electrode includes a plurality of first branch portions 2. The pixel electrode 1 includes a plurality of second branch portions 11 and a plurality of trunk portions 12. The first branch portions and the second branch portions are alternately arranged at intervals. The trunk portions include first trunk portions 121 and second trunk portions 122, the first trunk portions 121 are located within an orthographic projection range of an offset of a spacer of the pixel structure, the second trunk portions 122 are located outside the orthographic projection range, each trunk portion is connected with one end of each of two adjacent second branch portions 11. Each first trunk portion 121 has a height higher than that of each second trunk portion 122 along a linear direction in which the second branch portion 11 is located.

As shown in FIG. 3, each trunk portion 12 is connected with one end of each of two adjacent second branch portions 11, the plurality of trunk portions 12 are integrally formed. The height of each first trunk portion 121 within the orthographic projection range 4 of the offset of the spacer of the pixel structure is higher than the height of each second trunk portion 122 along the linear direction in which the second branch portion 11 is located.

It should be understood that the pixel drive circuit in the present application may be applied to a liquid crystal display (LCD), and the LCD pixel structure can increase the pressure-bearing capacity of the pixel electrode, thus the phenomenon of crack or fracture due to pressure-bearing can be effectively prevented, and the undesirable of dark lines in the pixel display can be improved.

The pixel electrode and the common electrode in the embodiment of the present application are transparent conductive films. For the material of the transparent conductive film, transparent conductive materials, such as indium tin oxide, indium tin oxide (ITSO) containing silicon (Si), indium zinc oxide (IZO) in which zinc oxide (ZnO) is mixed with indium oxide, etc., or compounds including mixtures of the above substances may be used, which will not be limited in here.

FIG. 1B illustrates a cross-sectional view of the spacer, the pixel electrode and the common electrode, as shown in FIG. 1B, main photo spacers 100 and sub photo spacers 200 are located in the light-emitting layer 300, the pixel electrode 1 is located below the spacer, and the common electrode 500 is electrically connected to the pixel electrode 1.

In FIG. 2, a position relationship between the spacer and the pixel electrode 1 is shown, when the spacer has no offset, a pressure will be generated by the spacer and applied to the device below the spacer within the orthographic projection range, in this case, the pressure generated by the spacer is applied to the pixel electrode 1 below the spacer. In this embodiment, the trunk portions 12 of the pixel electrode 1 within the orthographic projection range, i.e., the first trunk portions 121 are respectively arranged to have a height being higher than that of each second trunk portion 122, i.e., each first trunk portion 121 is extended a certain height on the basis of the second trunk portion 122, so that the first trunk portions of the trunk portions 12 have a wider structure, and the wide structure forms a faceted structure 13. Since the faceted structure 13 has a larger area, the pressure on the pixel electrode 1 is dispersed.

It can be understood that the orthographic projection range in the present application is a plane range due to the offset of the spacer, for example, if the offset range of the spacer is a circle A, then the above-mentioned orthographic projection range is a plane range that is in parallel to the circle A and can be coincided with the circle A when viewed in the vertical direction. It thus can be seen that the orthographic projection range and the circle A are parallel to each other and have the same center line, and any corresponding points on the circumference edges of the circle and the orthographic projection range are on the same line, and when the edge of circle A and the corresponding edge of the orthographic projection range are connected, a cylinder is formed. Similarly, if the offset range of the spacer is a square B, then a rectangular is formed when the corresponding edges of the orthographic projection range and the square are connected, which will not be repeated here.

Exemplarily, the plane may be flat, i.e., each trunk portion 12 is extended a setting length, optionally, each trunk portion 12 is extended the same or a different length, which is not limited in here.

For example, as shown in FIG. 2, an extension length of each trunk portion 12 is determined based on the orthographic projection range 4 of the offset of the spacer, each trunk portion 12 is extended to the edge of the orthographic projection range, i.e., the edges of the first trunk portions near the first branch portions and the edge of the orthographic projection range have at least overlap points, and when the orthographic projection range is circular, i.e., a trunk portion 12 located in the central position has the longest extension length, or alternatively, each trunk portion 12 has the same extension length, that is, these trunk portions 12 are extended to form a rectangle. Further, in an optional embodiment, the extended plane may also be processed based on requirements, such as forming at least one "hollow" in the plane to leave "empty space" for other devices, or to improve light transmission, etc.

In the embodiments of the present application, the spacer may be a main photo spacer (VIPS) or a sub photo spacer (SPS), in a specific embodiment, the mounting of the main photo spacers and the sub photo spacers are formed in the same process, i.e., the main photo spacers and the sub photo spacers are arranged in the same layer. The size and offset range of the main and sub photo spacers are different, with the main photo spacer is larger and has a larger offset range, and the sub photo spacer is smaller and has a smaller offset range.

Exemplarily, the offset range for the main photo spacer is a region formed by an extension of 0-45 um from main photo spacer, and the offset range for the sub photo spacer is a region forming by an extension of 0-25 um from the sub photo spacer.

Figure 10:
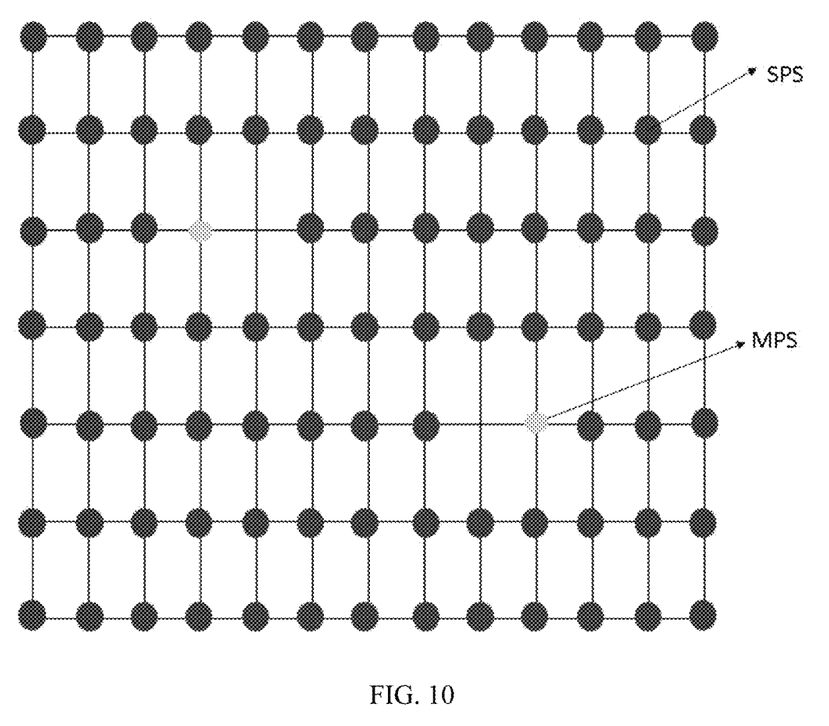
FIG. 10 is a cross-sectional view of an array substrate after a cell process in accordance with an embodiment of the present application.

As shown in FIG. 10, the distribution of the main and sub photo spacers in an embodiment of the present application shows that the main photo spacers are less in number and occupy two unit scales (as shown in FIG. 10, a side length of one square represents one unit scale), while the sub photo spacers occupy one unit scale.

In an optional embodiment, still referring to FIG. 1B, the pixel structure may also include a metal layer 3 covering the plane. The common electrode is electrically connected to the gate by depositing a conductive medium (e.g., metal) in a through-hole (not shown in the figures). An orthographic projection of the metal layer 3 covers the trunk portions 12, and an edge of the metal layer 3 near the same ends of the first branch portions 2 is in a gap formed between the trunk portions 12 and the same ends of the first branch portions 2.

In this embodiment, the orthographic projection of the metal layer covers the trunk portions, and the metal layer includes a first metal body within the orthographic projection range and a second metal body outside the orthographic projection range. The first metal body has a height being higher than that of the second metal body along the linear direction in which the second branch portions are located, and side-edges of the first and second metal bodies near the same ends of the first branch portions are in a gap formed between the first branch portions and the trunk portions, i.e., the orthographic projection of the metal layer 3 covers the plane formed by the trunk portions 12, the upper-side boundary line of the metal layer 3 is located at the end of the pixel electrode 1 and in the gap formed at the junctions, and optionally, in the middle of this gap, so that the metal layer 3 can provide support for the trunk portions 12 covered by the orthographic projection of the metal layer 3, after the cell process, thereby providing a certain buffer when the electrode is compressed due to the offset of the spacer. The upper edge of the metal layer 3 is arranged between the gap formed by the two electrodes, so that the ends of the first branch portions 2 are avoided from being deflected downward and then coming into contact with the metal layer 3, caused by the large pressure generated due to the small area of the first branch portions 2.

In an optional embodiment, as shown in FIG. 2, along the linear direction in which the second branch portions are located, the edges of the first trunk portions away from the second branch portions are contracted inwardly to a setting height, respectively. By such an arrangement, the trunk portions 12 are extended to form a faceted structure 13, an edge of the faceted structure 13 away from the end of a first gap section is contracted toward the inside of the plane to form a step bottom and edges of the trunk portions 12 that are not contracted on the same side forming the step top 17, where the step top 17 and the step bottom 15 are connected by a step sidewall 16, so that the edge of a side of the faceted structure 13 near the spacer is contracted inwardly, that is, the bottom of the faceted structure 13 is moved upward by a certain distance, or the trunk portions 12 corresponding to the formation of the step bottom is "moved" upward by a certain distance, to form a step shape. This embodiment can ensure the pixel penetration requirement and can effectively improve the undesirable effect of pixel dark line.

Exemplarily, the bottom of the faceted structure 13 in the above embodiment may be moved 2-9 um, such as 3 um or 5 um, etc. This range is a reasonable range that can guarantee the penetration requirement of pixels, which will not be repeated in here.

Further, in an optional embodiment of the present application, along a direction toward the second trunk portions, the first trunk portions include at least one first trunk sub-portion close to the second trunk portions, and second trunk sub-portions away from the second trunk portions. Each second trunk sub-portion has a height being higher than that of the at least one first trunk sub-portion along the linear direction in which the second branch portions are located.

In this embodiment, the trunk portions 12 are extended to form the faceted structure 13, along an arrangement direction of the trunk portion 12, the extension length of a trunk portion 12 adjacent to the edge of the orthographic projection range is shorter than that of the trunk portions 12 within the orthographic projection range excluding the one near the edge, as illustrated in the FIG. 9, it is shown a difference 18 in extension length between the trunk portion adjacent to the edge of the orthographic projection range and other trunk portions within the orthographic projection range excluding the one near the edge. FIG. 8, illustrates a difference 14 in length between the trunk portion adjacent to the edge of the orthographic projection range and other trunk portions that are not extended, and the difference 18 in extension length is a difference in height between the first trunk sub-portion and the second trunk sub-portion.

Specifically, as shown in FIG. 3, the extension length of the trunk portion 12 near the edge of the orthographic projection range is shorter than that of the other trunk portions 12 within the orthographic projection range excluding the one near the edge, and since the orthographic projection range is approximately circular, then the range at the edge of the circle is limited to an "arc", in this case, the extension length of the trunk portion 12 adjacent to the edge of the orthographic projection range is arranged to exactly match the length limited by the "arc", thereby enabling a maximization of the above faceted structure 13, so that the pixel electrode will not be easily fractured or cracked due to gaps and omissions when bearing pressure, and on the other hand a certain pixel penetration performance (i.e., light transmission rate) can be ensured.

Exemplarily, the extension length of the trunk portion 12 adjacent to the edge of the orthographic projection range is 2-5 um, which can effectively ensure the pixel penetration requirement and improve the undesirable effect of pixel dark line.

Furthermore, the pressure on the underlying device when the spacer has no offset is taken into account in an optional embodiment. In this embodiment, the common electrode also includes a limit portion 6 located within the orthographic projection range. The orthographic projection 5 of the spacer is partially coincided with the orthographic projection of the limit portion 6. An edge of the limit portion 6 near the trunk portion 12 is extended a setting length towards the trunk portion to increase the overlap area between the orthographic projection of the limit portion and the orthographic projection of the spacer.

In this embodiment, the limit portion 6 is located in the orthographic projection range 4 of the offset of the spacer, and has a function of supporting the spacer in the pixel structure. In this embodiment, the edge of the limit portion 6 near the trunk portions 12 is extended toward the trunk portions 12 to the setting length, to increase the overlap area between the orthographic projection 5 of the spacer and the orthographic projection of the limit portion as much as possible, thereby the pressure generated by the spacer can be dispersed, cracks or fractures in the limit portion 6 can be effectively prevented, and thus the undesirable effect of dark lines in the pixel display can be improved. While in combination with the aforementioned embodiment, along the linear direction in which the second branch portions are located, the edges of each first trunk portion away from the second branch portions are contracted inwardly to the setting height, respectively, which is equivalent to that the first trunk portions are moved upward as a whole while the relative area is not changed, thereby ensuring that the capacitance of the drive transistor of the pixel remains unchanged.

Further, in general, as shown in FIG. 4, the pixel electrode and the common electrode are alternately arranged at intervals. The pixel electrode and the common electrode are parallel to each other, and have intervals in the alternate arrangement. In an optional embodiment, along the linear direction in which the second branch portions are located, the first metal body is arranged to have side-edges being parallel to the second branch portions. In an optional embodiment, the pixel structure as shown in FIG. 4 is applied to ensure that a distance from the pixel electrode or the common electrode to the edge line of the metal layer 3 is within a range of 0-15 um, which on the one hand facilitates the arrangement of the pixel structure and can avoid the problem of space constraint caused by heterogeneous structures, and on the other hand can ensure the amount of light transmission in the open area above the metal layer 3, and can improve the undesirable effect of dark lines in the pixel display.

In an optional embodiment, at least overlap points are existed between the edges of the first trunk portions near the first branch portions and the edge of the orthographic projection range. That is, the edges of the trunk portions 12 extended to form the plane and the boundary line of the orthographic projection range have at least overlap points, this can ensure that the area of the faceted structure 13 formed by the trunk portions 12 is maximized, thus the stability of the pixel electrodes can be further improved, and the appearance of cracks can be avoided.

Further, as described in the above embodiments, the spacer in the present application may be a main photo spacer and a sub photo spacer. In case that the spacer is the main photo spacer, a difference between a radius of the orthographic projection range and a radius of the main photo spacer is in a range of 25-45 um, i.e., a radius of the offset range is the radius of the spacer plus 25-45 um. In case that the spacer is the sub photo spacer, a difference between the radius of the orthographic projection range and a radius of the sub photo spacer is in a range of 0-25 um.

In an optional embodiment, the spacer is the main photo spacer, and in this embodiment, the radius of the offset range is the radius of the spacer plus 25-45 um, and the distance between the same ends of the first branch portions and the metal layer is in a range of 2-20 um. This embodiment can ensure that the amount of light transmission in the open area above the ends of the first branch portions can be improved, while improving undesirable effect of the dark line in the pixel display caused by cracks or fractures of the pixel electrodes.

It should be understood that, in an embodiment of the present application, the pixel structure of the array substrate includes a display area and a non-display area formed at a peripheral area. Circuits for display, such as gate drive circuits (GOA), are arranged in the non-display area. The gate drive circuits may be distributed on the left and right sides of the array substrate. However, it is understood that the distribution of gate driver circuits is not limited to this. In practice, the gate drive circuit may also be in the form of a unilateral drive.

The gate drive circuit is coupled to a switch element via wires. In the array substrate, the switch element may be a thin film transistor (TFT), the TFT includes a source, a drain and a gate.

Further, the through-hole in the present application may be formed by etching, exposure, and development technology, for example, the photo-resist is firstly laid on the location where a through-hole needs to be formed, and then exposed through the mask corresponding to the through-hole, forming a cylinder on the photo-resist layer, after the exposure, the photo-resist is in liquid form and then removed, subsequently, an insulation layer is deposited, etc., to continue to expose the cylindrical photo-resist, thereby forming the through-hole in the insulation layer.

Alternatively, a through-hole pattern may be formed by a perforation technique such as laser irradiation, for example, a laser irradiation having an energy of 700 to 900 mJ is applied for 6 to 10 seconds, in one example, a laser irradiation having an energy of 800 mJ is applied for 10 seconds, and in another example, a laser irradiation having an energy of 850 mJ is applied for 9 seconds.

As can be known from the above solutions, in the present application, the pressure-bearing capacity of the pixel electrode is increased by configuring the height of each first trunk portion to be higher than the height of each second trunk portion along the linear direction in which the second branch portions are located, so that portions of the pixel electrode within the orthographic projection range of the offset of the spacer are extended to form a plane, which can effectively prevent the phenomenon of cracks or fractures due to pressure-bearing and improve the problem of undesirable dark lines appearing in the pixel display.

In accordance with an embodiment of the present application, a display panel is also provided, which may include the pixel structure as above-described. The display panel may be a liquid crystal display (LCD) panel, and the LCD panel may be a twisted nematic (TN) panel, or a type of vertical alignment (VA) panel, an in-plane switching (IPS) panel and a continuous pinwheel alignment (CPA) panel.

The display panel in this embodiment includes a pixel structure. The pixel structure includes: a pixel electrode and a common electrode. The pixel electrode and the common electrode each is one of a pixel electrode and a common electrode. The common electrode includes a plurality of first branch portions. The pixel electrode includes second branch portions and trunk portions. The first branch portions and the second branch portions are alternately arranged at intervals.

The trunk portions include first trunk portions and second trunk portions, the first trunk portions are located within the orthographic projection range of the offset of the spacer of the pixel structure, and the second trunk portions are located outside the orthographic projection range. Each trunk portion is connected with one end of each of two adjacent second branch portions. The height of each first trunk portion is higher than the height of each second trunk portion along the linear direction in which the second branch portions are located.

The display panel of the present application is provided with the pixel structure as described in the above embodiments, where portions of the pixel electrode within the orthographic projection range of the offset of the spacer are extended to form a plane, thus the pressure-bearing capacity of the pixel electrode is increased, the phenomenon of cracks or fractures due to pressure-bearing can be effectively prevented, and the problem of undesirable dark lines appearing in the pixel display can be improved.

The present application also provides a fabrication method of a pixel structure, a cross-sectional view of a display area after the cell process of the array substrate is shown in FIG. 10, firstly, a first metal layer is fabricated on a substrate glass, then an insulation layer is fabricated on top of the metal layer, and then a gate of the TFT is fabricated on the insulation layer, and the source drain are formed by the metal layer, after that, a color film is formed by deposition, an insulation layer is fabricated on the color film, and then the pixel electrode is fabricated, where com and pxl denote the common electrode and the pixel electrode, respectively, both are ITO and are formed in the same process. The main photo spacer (MPS) and sub photo pacer (SPS) are formed in the same process, which will not be limited in this application.

It can be known that, the fabrication of through-holes is also required in the above embodiments, in an optional embodiment, the through-holes may be formed by etching, exposure, development technology, for example, the photo-resist is firstly laid on the location where a through-hole needs to be formed, and then exposed through the mask corresponding to the through-hole, forming a cylinder on the photo-resist layer, after the exposure, the photo-resist is in liquid form and then removed, subsequently, an insulation layer is deposited, etc., to continue to expose the cylindrical photo-resist, thereby forming the through-hole in the insulation layer.

The fabrication method of a pixel structure of this application can effectively prevent cracks or fractures in ITO. Thus, the dark line defect in pixel display can be improved.

Figure 11:
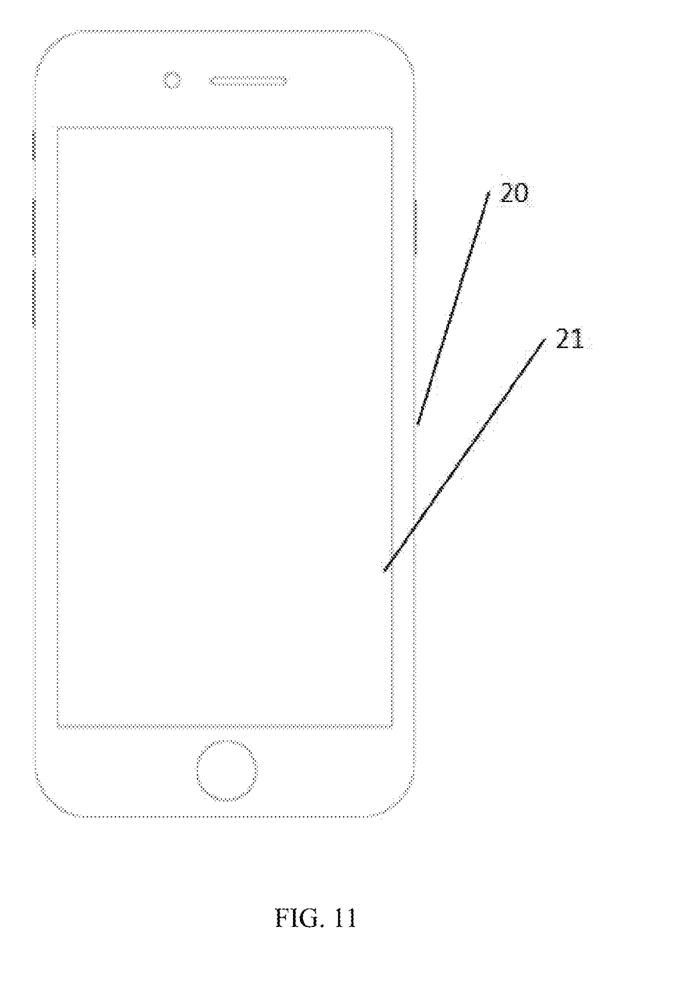
FIG. 11 is a schematic diagram of a structure of a display device in accordance with an embodiment of the present application.

In accordance with an embodiment of the present application, a display device is also provided, as shown in FIG. 11, the display device 20 may include the display panel 21 as described above. The display panel 21 includes the pixel structure, it can be understood that the pixel structure is shown independently in FIG. 8 for ease of understanding, in fact, the pixel structure is generally built-in inside the entire display device 20, which will not be further described here.

In a specific implementation, the display device provided by an embodiment of the present application may be any product or component having display function such as cell phone, tablet PC, TV, monitor, laptop, digital photo frame, navigator, etc.

It should be noted that the pixel structure, display panel and display device provided by the embodiments of the present application may be cross-referenced, and the embodiments of this application are not limited in this regard. Steps of the method embodiment of the display panel provided by the present application may be increased or decreased accordingly, and any method that can be easily appreciated by a person skilled in the art within the scope of the technologies disclosed in this application should be covered within the protection scope of this application, which will not be further described here.

The above-mentioned are merely some optional embodiments of the present application and are not intended to limit the present application. Any modifications, equivalent substitutions, improvements, etc. made within the spirit and principles of the present application shall all be included within the protection scope of the present application.

What is claimed is:

1. A pixel structure, applied to a display panel, and comprising:
   a common electrode, comprising:
      a plurality of first branch portions; and
   a pixel electrode, comprising:
      a plurality of second branch portions, the plurality of second branch portions and the plurality of first branch portions being alternately arranged at intervals; and
      trunk portions, comprising:
         first trunk portions, located within an orthographic projection range of an offset of a spacer of the display panel; and
         second trunk portions, located outside the orthographic projection range,
         wherein each trunk portion is connected with one end of each of two adjacent second branch portions,
      wherein a height of each first trunk portion is higher than a height of each second trunk portion along a linear direction in which the second branch portions are located
      wherein, along a direction towards the second trunk portions, the first trunk portions comprise at least one first trunk sub-portion close to the second trunk portions and second trunk sub-portions away from the second trunk portions, wherein each second trunk sub-portion has a height higher than that of the at least one first trunk sub-portion along the linear direction in which the second branch portions are located,
   a metal layer having an orthographic projection covering the trunk portions, the metal layer comprising:
      a first metal body located within the orthographic projection range; and
      a second metal body located outside the orthographic projection range,
      wherein the first metal body has a height that is higher than that of the second metal body along the linear direction in which the second branch portions are located, and edges of the first metal body and the second metal body near the first branch portions are in a gap formed between the first branch portions and the trunk portions.

2. The pixel structure according to claim 1, wherein edges of the first trunk portions away from the second branch portions are contracted inwardly to a setting height, respectively, along the linear direction in which the second branch portions are located.

3. The pixel structure according to claim 2, wherein the common electrode further comprises:

a limit portion, located within the orthographic projection range, wherein an orthographic projection of the spacer and an orthographic projection of the limit portion are overlapped;

an edge of the limit portion near the trunk portions is extended towards the trunk portions for a setting length to increase an overlap area between the orthographic projection of the limit portion and the orthographic projection of the spacer.

4. The pixel structure according to claim 1, wherein edges of the first metal body along the linear direction in which the second branch portions are located, are arranged in parallel to the second branch portions.

5. The pixel structure according to claim 1, wherein edges of the first trunk portions near the first branch portions and an edge of the orthographic projection range have at least overlap points.

6. The pixel structure according to claim 1, wherein the spacer is a main photo spacer and a difference between a radius of the orthographic projection range and a radius of the main photo spacer is in a range of 25-45 um, or alternatively, the spacer is a sub photo spacer and a difference between the radius of the orthographic projection range and a radius of the sub photo spacer is in a range of 0-25 um.

7. A display panel, comprising:
   a pixel structure, applied to a display panel, and comprising:
      a common electrode, comprising a plurality of first branch portions; and
      a pixel electrode, comprising:
         a plurality of second branch portions, the plurality of second branch portions and the plurality of first branch portions being alternately arranged at intervals; and
         trunk portions, comprising:
            first trunk portions, located within an orthographic projection range of an offset of a spacer of the display panel; and
            second trunk portions, located outside the orthographic projection range,
            wherein each trunk portion is connected with one end of each of two adjacent second branch portions,
         wherein a height of each first trunk portion is higher than a height of each second trunk portion along a linear direction in which the second branch portions are located,
         wherein, along a direction towards the second trunk portions, the first trunk portions comprise at least one first trunk sub-portion close to the second trunk portions and second trunk sub-portions away from the second trunk portions, wherein each second trunk sub-portion has a height higher than that of the at least one first trunk sub-portion along the linear direction in which the second branch portions are located,
      a metal layer, having an orthographic projection covering the trunk portions, the metal layer comprising:
         a first metal body located within the orthographic projection range; and
         a second metal body located outside the orthographic projection range,
         wherein the first metal body has a height that is higher than that of the second metal body along the linear direction in which the second branch portions are located, and edges of the first metal body and the second metal body near the first branch portions are in a gap formed between the first branch portions and the trunk portions.

8. The display panel according to claim 7, wherein edges of each first trunk portion away from the second branch portions are contracted inwardly to a setting height, respectively, along the linear direction in which the second branch portions are located.

9. The display panel according to claim 8, wherein the common electrode further comprises:
a limit portion, located within the orthographic projection range, wherein an orthographic projection of the spacer and an orthographic projection of the limit portion are overlapped;
an edge of the limit portion near the trunk portions is extended towards the trunk portions for a setting length to increase an overlap area between the orthographic projection of the limit portion and the orthographic projection of the spacer.

10. The display panel according to claim 7, wherein edges of the first metal body along the linear direction in which the second branch portions are located, are arranged in parallel to the second branch portions.

11. The display panel according to claim 7, wherein edges of the first trunk portions near the first branch portions and an edge of the orthographic projection range have at least overlap points.

12. The display panel according to claim 7, wherein the spacer is a main photo spacer and a difference between a radius of the orthographic projection range and a radius of the main photo spacer is in a range of 25-45 um, or alternatively, the spacer is a sub photo spacer and a difference between the radius of the orthographic projection range and a radius of the sub photo spacer is in a range of 0-25 um.

13. A display device, comprising:
a display panel, comprising:
a pixel structure, applied to a display panel, and comprising:
a common electrode, comprising a plurality of first branch portions; and
a pixel electrode, comprising:
a plurality of second branch portions, the plurality of second branch portions and the plurality of first branch portions being alternately arranged at intervals; and
trunk portions, comprising:
first trunk portions, located within an orthographic projection range of an offset of a spacer of the display panel; and
second trunk portions, located outside the orthographic projection range,
wherein each trunk portion is connected with one end of each of two adjacent second branch portions,
wherein a height of each first trunk portion is higher than a height of each second trunk portion along a linear direction in which the second branch portions are located,
wherein, along a direction towards the second trunk portions, the first trunk portions comprise at least one first trunk sub-portion close to the second trunk portions and second trunk sub-portions away from the second trunk portions, wherein each second trunk sub-portion has a height higher than that of the at least one first trunk sub-portion along the linear direction in which the second branch portions are located,
a metal layer, having an orthographic projection covering the trunk portions, the metal layer comprising:
a first metal body located within the orthographic projection range; and
a second metal body located outside the orthographic projection range,
wherein the first metal body has a height that is higher than that of the second metal body along the linear direction in which the second branch portions are located, and edges of the first metal body and the second metal body near the first branch portions are in a gap formed between the first branch portions and the trunk portions.

* * * * *